United States Patent
Haupt et al.

(10) Patent No.: US 8,123,310 B2
(45) Date of Patent: Feb. 28, 2012

(54) METHOD FOR CONTROLLING A BRAKE SYSTEM OF A MOTOR VEHICLE

(75) Inventors: Karlheinz Haupt, Gau-Algesheim (DE); Alfred Eckert, Mainz-Hechtsheim (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 817 days.

(21) Appl. No.: 10/556,925

(22) PCT Filed: Apr. 29, 2004

(86) PCT No.: PCT/EP2004/050641
§ 371 (c)(1),
(2), (4) Date: Apr. 27, 2007

(87) PCT Pub. No.: WO2004/101308
PCT Pub. Date: Nov. 25, 2004

(65) Prior Publication Data
US 2007/0296264 A1 Dec. 27, 2007

(30) Foreign Application Priority Data
May 13, 2003 (DE) .................................. 103 21 644

(51) Int. Cl.
*B60T 8/64* (2006.01)
(52) U.S. Cl. .................................. 303/152; 303/155
(58) Field of Classification Search .................. 303/152, 303/3, 20, 151, 113.1, 15, 119.1, 115.2, 116.1, 303/116.2, 155
See application file for complete search history.

(56) References Cited

U.S. PATENT DOCUMENTS

| | | | |
|---|---|---|---|
| 5,326,158 A | 7/1994 | Ohori et al. | |
| 5,505,527 A * | 4/1996 | Gray et al. | 303/3 |
| 5,853,229 A | 12/1998 | Willmann et al. | |
| 6,216,808 B1 * | 4/2001 | Kuno et al. | 303/152 |
| 2002/0011362 A1 | 1/2002 | Toda | |
| 2003/0173826 A1 | 9/2003 | Tazoe et al. | |

FOREIGN PATENT DOCUMENTS

| | | |
|---|---|---|
| EP | 1106461 | 6/2001 |
| EP | 1167151 | 1/2002 |

* cited by examiner

*Primary Examiner* — Melanie Torres Williams

(57) ABSTRACT

Disclosed is a method for controlling a brake system (1) of a motor vehicle having an electric-regenerative brake, in particular a generator (4), and a number of hydraulic friction brakes (2) driven by at least one brake pressure generating means by way of a braking medium (B). The brake system is controlled so that the total deceleration of the brake system is composed of deceleration components of the friction brakes (2) and the electric-regenerative brake, thus achieving maximum brake comfort. The braking medium (B) is discharged into a pressure accumulator (12) when braking with an electric-regenerative brake.

16 Claims, 7 Drawing Sheets

METHOD FOR CONTROLLING A BRAKE SYSTEM OF A MOTOR VEHICLE

This application is the U.S. national phase of international application PCT/EP04/50641 filed Apr. 29, 2004, which designated the U.S. and which claims the benefit of priority of German Patent Application Number 103 21 644.8 filed May 13, 2003. The contents of each of the aforementioned documents are incorporated herein in their entirety.

BACKGROUND OF THE INVENTION

The present invention relates to a method for controlling a brake system, in particular for controlling a regenerative brake system with a number of friction brakes and an electric-regenerative brake for a motor vehicle.

The purpose of regenerative brake systems in motor vehicles involves storing at least part of the energy produced during braking in the vehicle and re-using it for the drive of the vehicle. This allows reducing the energy consumption of the vehicle in total, increasing the efficiency, and thus rendering the vehicle's operation more economical. To this effect, motor vehicles with a regenerative brake system generally include different types of brakes, which are also called brake actuators.

Typically, hydraulic friction brakes, as known from customary motor vehicles, and an electric-regenerative brake are employed in this arrangement. Like in conventional friction brakes, the brake pressure for the friction brakes is generated by means of a brake pressure generating means or by way of the brake pedal movement, respectively. The electric-regenerative brake is generally configured as an electric generator, through which at least part of the total brake output is generated. The produced electric energy is fed or fed back, respectively, into a storage medium such as an on-board battery, and is re-used for the drive of the motor vehicle by way of an appropriate drive.

Regenerative brake systems can be designed as so-called serial regenerative concepts where the component of the brake torque which is produced by the generator is as high as possible. In contrast thereto, parallel or so-called residual-moment-based regenerative concepts are known, where the brake torque is distributed to the brake actuators in predefined ratios. Mixed concepts of these two brake concepts are also known. It is common to all of the systems that several brake actuators are used for simultaneous braking at least in some ranges of the brake torque to be generated so that the total deceleration is composed of the deceleration components of the brake actuators.

So-called 'x-by-wire' brake systems are principally known in serial regenerative brake systems. In 'x-by-wire' brake systems, the braking energy is generally split up into components of the friction brakes and components of the electric generator, said split-up being dependent on the nominal brake torque, the charging condition of the battery, and especially the field of operation and other special properties of the generator. Due to the split-up of braking energy, the brake pressure is built up independently of the hydraulic influence of the brake pedal in 'x-by-wire' brake systems.

In conventional brake systems, however, which have only one friction brake, the brake pressure is built up depending on the position of the brake pedal. In this arrangement, the pressure of a braking medium is built up by way of the position of the brake pedal with or without auxiliary energy, the braking medium being received in the friction brake. Thus, the pedal position corresponds to the braking behavior of the motor vehicle. Exceptions may be the use of electronic safety systems such as the electric stability program (ESP), which can comprise devices for the independent brake pressure development irrespective of the brake pedal position.

Compared to this conventional brake performance, the brake performance of an 'x-by-wire' brake system suffers from the shortcoming that the position of the brake pedal does not correspond with the brake performance of the motor vehicle. Thus, the position of the brake pedal may remain constant for example during an increase in the braking acceleration, what is a very unusual brake feel for the driver. Therefore, this behavior of the brake system provides very poor brake comfort. Further, it is possible that the brake feel which is unusual or different from the brake performance of the motor vehicle, in particular during a brake operation, induces the driver to frequently change the brake pedal position, which, in addition to the unusual brake feel, can impair vehicle safety, for example because the driver's attention is diverted from braking.

SUMMARY OF THE INVENTION

In view of the above, an object of the invention is to disclose a method for controlling a brake system which includes an electric-regenerative brake, in particular a generator and a number of friction brakes so that high braking comfort can be achieved by the brake system.

This object is achieved by the invention because braking medium is discharged into a pressure accumulator when braking with an electric-regenerative brake of a brake system described hereinabove.

The invention is based on the reflection that a brake torque of the electric-regenerative brake or the generator, respectively, is available in a varying magnitude during a brake operation. The reason for this is, among others, that electric-regenerative brakes like generators have working ranges limited due to their specific properties. Thus, they are e.g. limited to determined speed ranges and to maximum brake torques. To be able to utilize the electric-regenerative brake with a high efficiency for realizing a serial regenerative brake system, this brake cannot be utilized permanently in parallel to hydraulic friction brakes, but only in ranges that are appropriate for it.

In the case of a like working range of the electric-regenerative brake, however, an alleged malfunction of the pressure consumption balance of the braking medium of the friction brakes will occur, because compared to a purely conventional braking operation with friction brakes, less brake pressure generated by the brake pressure generating means is reduced by the friction brakes, when looking upon the achieved deceleration of the acceleration, because the electric-regenerative brake does not reduce the braking medium pressure or does not use pressure volume during operation, respectively. Therefore, the invention continues founding on the consideration that for achieving a comfortable brake performance, one would have to simulate the brake performance of a conventional brake system with friction brakes for the brake torque component of the electric-regenerative brake. Therefore, braking medium is discharged into a pressure accumulator when braking with an electric-regenerative brake in order to simulate additional braking of the friction brakes in such a fashion. This way the pressure of the braking medium or the pressure volume is reduced which, in turn, reacts to the brake pressure generating means. When a brake pedal, which may be controlled by auxiliary force, is employed as a brake pressure generating means, said brake pedal will yield corresponding to the braking medium discharged when braking with the electric-regenerative brake, with the result that the previously prevailing brake pressure and, thus, a comfortable brake feel will develop.

In order to simulate precisely the corresponding brake performance which would appear with friction brakes, favorably precisely that pressure volume of braking medium is discharged which would be reduced by friction brakes if the brake torque generated by an electric-regenerative brake had to be generated alone by means of hydraulic friction brakes.

For an exact determination of the braking request, a nominal brake torque is suitably determined by way of the brake pedal of the brake system.

To this end the brake pedal preferably includes a pedal travel indicator and a pressure sensor that is positioned in the hydraulic conduit leading to the pressure generating means or the brake pedal, respectively. The pressure sensor and the pedal travel indicator may favorably have a redundant design to achieve a high degree of safety of operation. It is possible to determine the nominal brake torque from a determination of the position of the brake pedal, being carried out by the travel indicator, and from the brake pedal pressure applied.

For the control of the brake system during a brake operation, a brake operation is favorably divided into a number of time phases by way of an electronic control unit, with said phases differing from each other by the division of the brake torque of friction brakes and electric-regenerative brakes. The fact is then taken into account that the electric-regenerative brake can be employed only in selected working areas. Besides, it is possible to increase or decrease the brake torque component of the electric-regenerative brake due to the division into several time control phases in case of a change of the efficiency of the electric-regenerative brake which can occur in the course of operation. Therefore, the division into phases allows braking with a great brake component of the electric-regenerative brake.

In order to adjust in these phases the pressure of the braking medium for a brake feel that corresponds to the brake performance, a first control process is suitably performed during a braking operation by way of a control unit, the said control process adjusting nominal brake pressures at the friction brakes, and a second control process is performed in which the pressure of a braking medium reacting to a brake pressure generating means is adjusted for the adjustment of a force/travel deceleration curve for a brake generating means, said curve being predetermined by the brake system. The consideration is that a change of the brake torque of the friction brakes causes a change of the pressure of the braking medium so that a nominal brake torque should be adjusted initially on the friction brakes. It is subsequently required to control the corresponding pressure of the braking medium for the brake generating means, which is preferably adjusted at predetermined force/travel deceleration curves, in order to obtain a pressure corresponding to the deceleration behavior and an appropriate pressure volume of the braking medium. This is done subject to the requirement that the resulting pressure and the resulting pressure volume will not lead to any undesirable change of the nominal brake pressure on the friction brakes and, in addition, as intended, a pressure representing the brake performance is obtained, or a pressure volume of the braking medium reacting to the pressure generating means or the brake pedal, respectively.

In order to set these control processes in the brake system, the requirements resulting from a control process are introduced into the basic brake system preferably by way of a control unit, and one of the two phases is set depending on the condition of the brake system.

To set the phases at the brake system, the brake system favorably includes in addition to the components described hereinabove a hydraulic unit with electrically controllable hydraulic valves and hydraulic conduits which interconnect the components of the brake system.

To be able to discharge the braking medium as easily as possible into the pressure accumulator by way of a hydraulic valve when the braking medium pressure is adjusted, the pressure accumulator is suitably designed as a low-pressure accumulator compared to the hydraulic system of the brake system. To enable braking medium to discharge into the pressure accumulator, it is only necessary to open a hydraulic valve due to the pressure difference.

With the objective of comfortable brake performance, it may be required for changing the nominal brake torque of the friction brakes not to change the brake torque by way of the pressure generating means or the brake pedal, respectively. Such a requirement can prevail when the brake torque is shifted from the electric-regenerative brake to the friction brake at a constant brake deceleration request. Therefore, the hydraulic unit preferably includes another brake pressure generating means with auxiliary energy allowing hydraulic brake pressure to be generated by way of a braking medium for the friction brakes.

In order not to change the pressure of the braking medium and, thus, the nominal deceleration, the pressure accumulator is advantageously connected to the additional brake pressure generating means on the outlet side. When brake torque is shifted from the electric-regenerative brake to the friction brakes, the pressure volume of the braking medium required for this operation is supplied by way of the additional pressure generating means from the pressure accumulator into the braking medium pressure cycle or the corresponding hydraulic conduits of the friction brakes, respectively. This means that only the pressure volume rather than the pressure of the braking medium is changing. Any effect on the first brake pressure generating means is thereby prevented. By way of the additional brake pressure generating means, it is also possible to empty the pressure accumulator after a braking operation through the outlet-end arrangement at the pressure accumulator.

To initiate the envisaged pressure generating processes by means of the brake pressure generating means, suitably, the one brake pressure generating means is a master brake cylinder operated by auxiliary force, in particular a tandem master cylinder, while the additional pressure generating means is an electrically operable hydraulic pump, in particular a gear pump.

In order to sense the brake pressure of the braking medium on the friction brakes for a brake operation and in particular for the control processes to be performed, a pressure sensor for measuring the pressure of a braking medium is positioned in a number of hydraulic conduits leading to the friction brakes. The detection of the braking medium pressure allows calculating and controlling the processes described hereinabove by way of the electronic control unit.

To this end, the electrically controllable hydraulic valves can preferably be actuated in such a fashion that pressure control may be executed by way of a hydraulic valve.

The advantages achieved by means of the invention especially render it possible to provide a purely serial regenerative brake system with a very comfortable brake performance. In the optimal case, the brake performance corresponds to the brake performance of a conventional brake system with friction brakes so that the driver optimally does not notice any difference. By adjusting an appropriate brake pressure reacting to the brake pedal, it is possible to safeguard a great brake torque component of the electric-regenerative brake or the generator, respectively, so that comparatively much energy is regained during braking, with the result that the efficiency of the motor vehicle is enhanced.

Further advantages achieved by the invention involve that the described brake system and the method allow realizing electronic safety programs such as ABS and ESP. Further, a so-called OHB-V function (OHB-V—optimized hydraulic brake with brake booster) can be performed by means of the system. In this function, an insufficient pressure being generated by way of a brake booster or a brake pressure generating means can be boosted additionally by means of the additional brake pressure generating means.

It is additionally possible to realize a laterally oriented electronic brake distribution without influencing the brake pedal because the brake pressure of the friction brakes is shifted between left and right.

BRIEF DESCRIPTION OF THE DRAWINGS

An embodiment is explained by way of FIGS. 1 to 7. In the accompanying drawings.

DETAILED DESCRIPTION OF THE DRAWINGS

Figure 1:
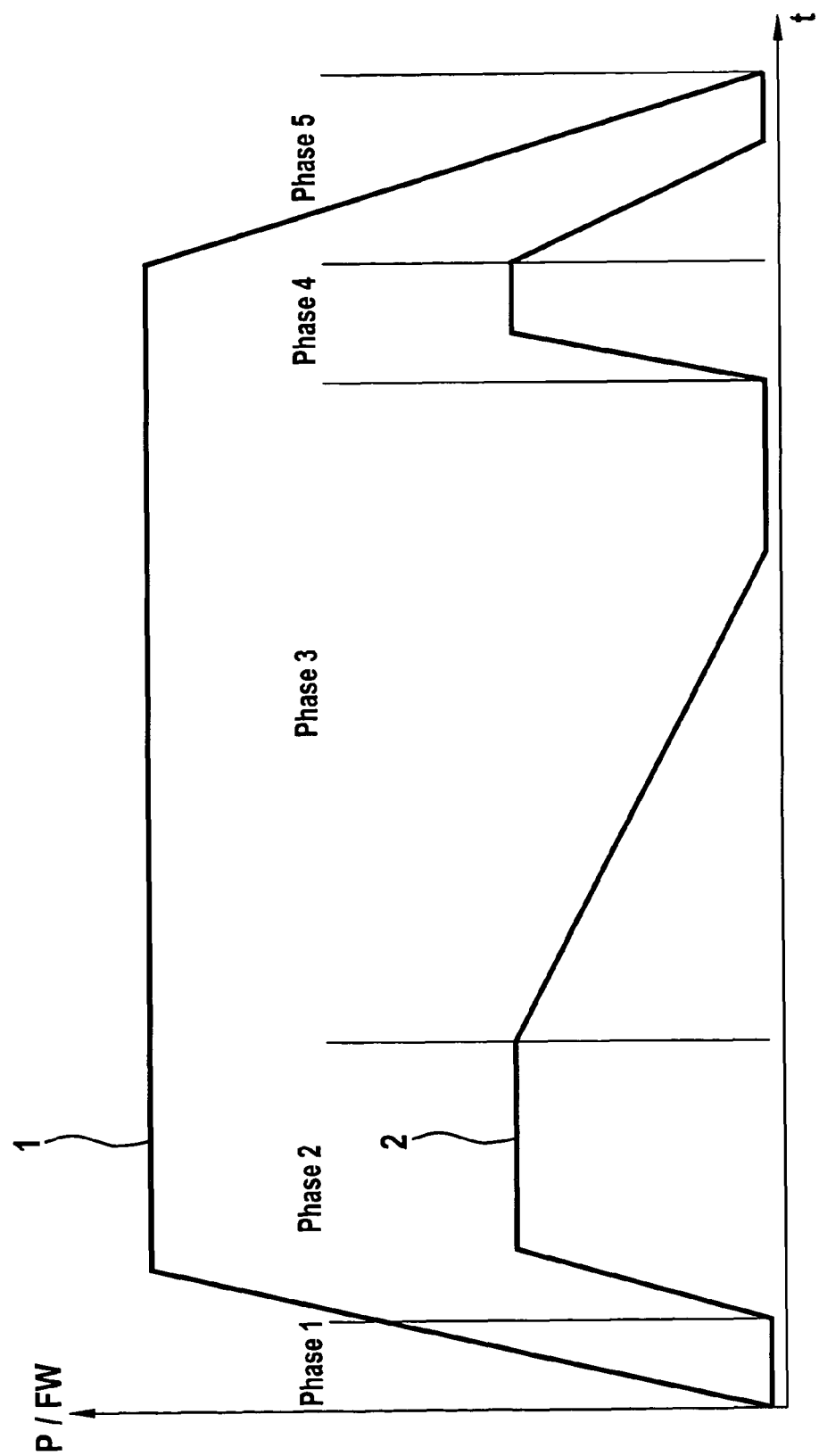
FIG. 1 shows the braking request and the wheel brake pressure in a brake operation, being split up into the phases 1 to 5.

Like parts have been assigned like reference numerals in all Figures.

Figure 2:
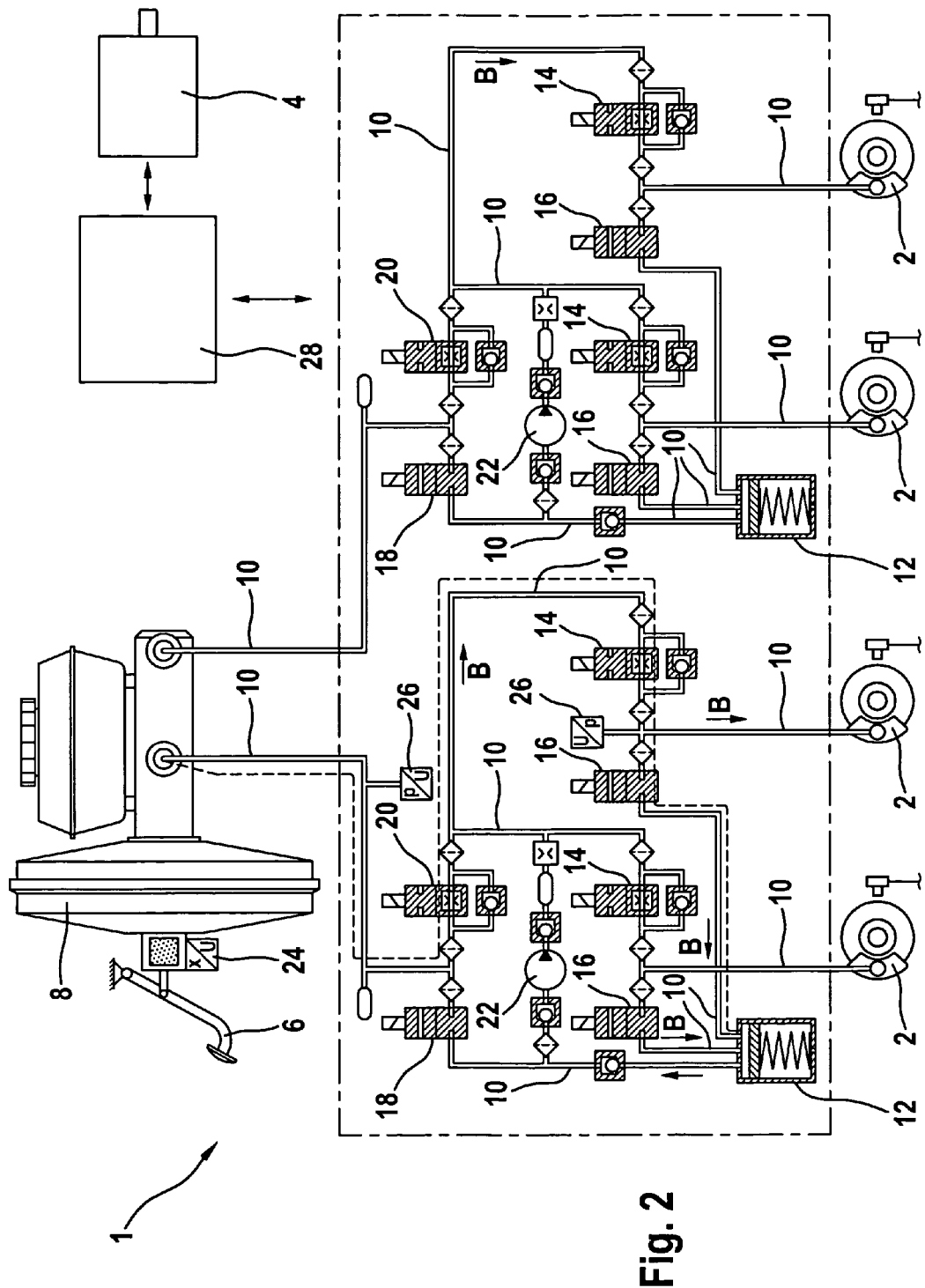
FIG. 2 shows a brake system (1) in phase 1.

FIG. 2 illustrates a basic circuit diagram of a brake system 1 for a motor vehicle. Brake system 1 is a regenerative brake system 1 which, apart from the four friction brakes 2, also includes an electric generator 4 for producing electric energy. The brake system 1 is configured as a purely serial brake system 1, and a maximum high brake torque shall be generated by way of the electric generator 4 in order to achieve a high rate of economic efficiency of the motor vehicle.

For a detailed explanation, FIG. 1 shows a braking operation, curve 1 plotting the deceleration request which is introduced by the driver of the motor vehicle by applying the brake pedal 6, while the pressure of the braking medium B of a friction brake 2 is plotted as a function of time in curve 2. A defined starting speed of the motor vehicle is made the basis in this arrangement. The braking operation is subdivided into five phases. The brake pedal 6 is depressed vigorously in phase 1. As this occurs, the total brake torque is generated by generator 4, initially with the brake pedal 6 not yet fully depressed. At the transition to the phase 2, the area is left in which the generator 4 can provide the brake torque in full extent so that the brake torque component of the friction brake 2 rises until the final value in phase 2. In phase 3 the speed of the motor vehicle has dropped to a range in which the generator 4 commences working with higher efficiency so that the brake component of the friction brake 2 decreases until 0. The optimal working range of the generator 4 is left again in phase 4 so that the share of the friction brake 2 rises again. In phase 5 the driver releases the brake pedal 6, and the brake torques of friction brake 2 and generator 4 recede until 0. The phases of the braking operation are adjusted by way of an electronic control unit 28 which especially adjusts also the brake torque of the generator 4.

To generate the main brake torque for the friction brakes 2, the brake system 1 is equipped with a brake booster which is configured as a tandem master cylinder 8 with auxiliary force. In this arrangement, the brake pressure generated by the tandem master cylinder 8 is conducted via hydraulic conduits 10 with a braking medium B to the friction brakes 2.

Apart from a high degree of economic efficiency of the brake system 1, another design target is to achieve a maximum comfortable brake feel for the driver by way of the brake pedal 6. To achieve this aim, braking medium B can be discharged into the pressure accumulator 12 when the generator 4 is operated.

To control the brake system 1 in conformity with this requirement, the electronic control unit 28 is configured in such a fashion that the brake system 1 and, more particularly, the hydraulic system of the brake system 1 can be adjusted with the control unit 28 corresponding to the phases of a braking operation by way of corresponding electronically controllable hydraulic valves. Valves 14 and 16 are designated in terms of whether they are normally open or closed, i.e. without electric energization. The NO-valve 14 is normally open and the NC-valve 16 is normally closed. The ERV-valve 18 (Electrical Reversing Valve) corresponds to an electronic change-over valve.

A control operation principally includes a first control process adjusting the nominal brake torque on the friction brakes 2, and a second control process which is used to adjust a force/travel deceleration curve predetermined by the brake system 1 and used for the braking medium B in order to reach a corresponding position and depression of the brake pedal 6.

The nominal brake torque and the braking medium pressure on the friction brakes 2 are used as input and control quantities. As can be seen in FIG. 2, the nominal brake torque is initially determined by way of the electronic control unit 28 by means of a travel indicator 24, which is positioned at the brake pedal 6, and a pressure sensor 26 which is disposed at the hydraulic conduit 10 leading to the tandem master cylinder 8. The braking medium pressure on the friction brakes 2 is achieved by a pressure sensor 26 which is positioned in a hydraulic conduit of a friction brake.

As can be seen in FIG. 2, the brake system 1 includes two pressure accumulators 12 and a number of hydraulic components for each friction brake 2. The control sequence of the brake system 1 for the braking operation described hereinabove will be described in the following merely with respect to one friction brake 2. The system components of the other friction brakes 2 are functioning correspondingly. The course of the braking medium B in the hydraulic unit is characterized by lines.

In phase 1 of the braking operation, the electronic control unit 28 is used to open the NC-valve 16 in full extent and to open the NO-valve 14 in a controlled manner so that braking medium B is discharged out of the hydraulic conduit 10 of the friction brake 2 into the pressure accumulator 12. To safeguard this action, the pressure accumulator 12 in comparison to the hydraulic conduit 10 is designed as a low-pressure accumulator. The operation of a friction brake is simulated by the discharge of braking medium B. The brake pedal 6 yields corresponding to the discharged pressure volume so that a brake feel develops which is comfortable and corresponds to the driving performance.

Figure 3:
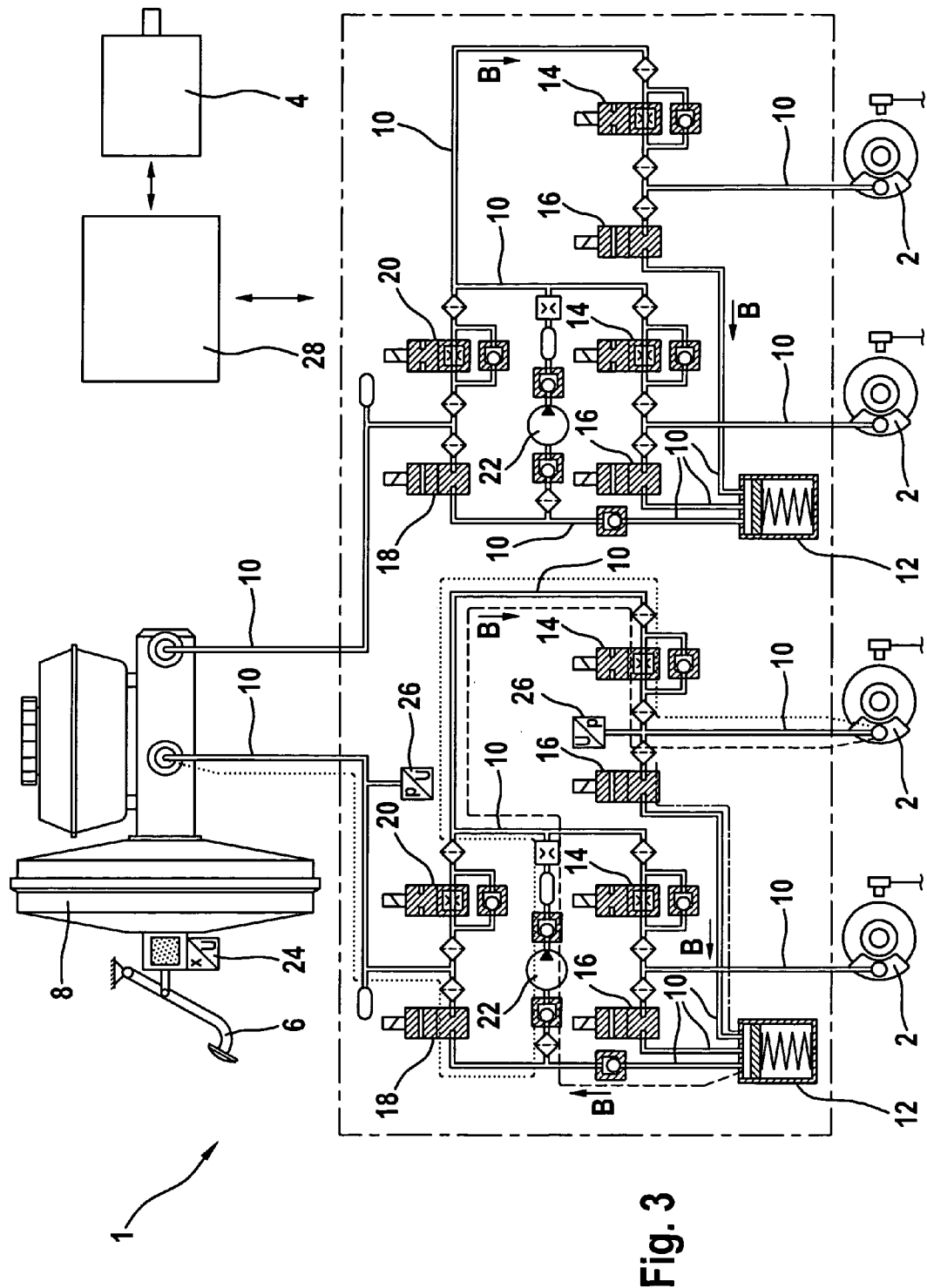
FIG. 3 shows a brake system (1) in phase 2.

In order to increase the brake torque of friction brake 2 in phase 2 which is illustrated in FIG. 3, the braking medium B is pumped out of pressure accumulator 12 into the hydraulic conduit 10 of the friction brake 2. The motor-and-pump assembly 22 is employed for this purpose that is positioned on the outlet side of the pressure accumulator 12 and is configured as a gear pump that can be operated electrically by way of the control unit. The corresponding brake pressure of the friction brake 2 is controlled by way of the NO-valve 14. The pressure in the tandem master cylinder 8 and, hence, the pressure prevailing at the brake pedal 6 are controlled by means of the electrical reversing valve 18. The pressures are superposed on each other as can be seen from the curves in FIG. 3. Superfluous braking medium B is conducted into the pressure accumulator 12 in a fashion controlled by way of the NC-valve 16.

Figure 4:
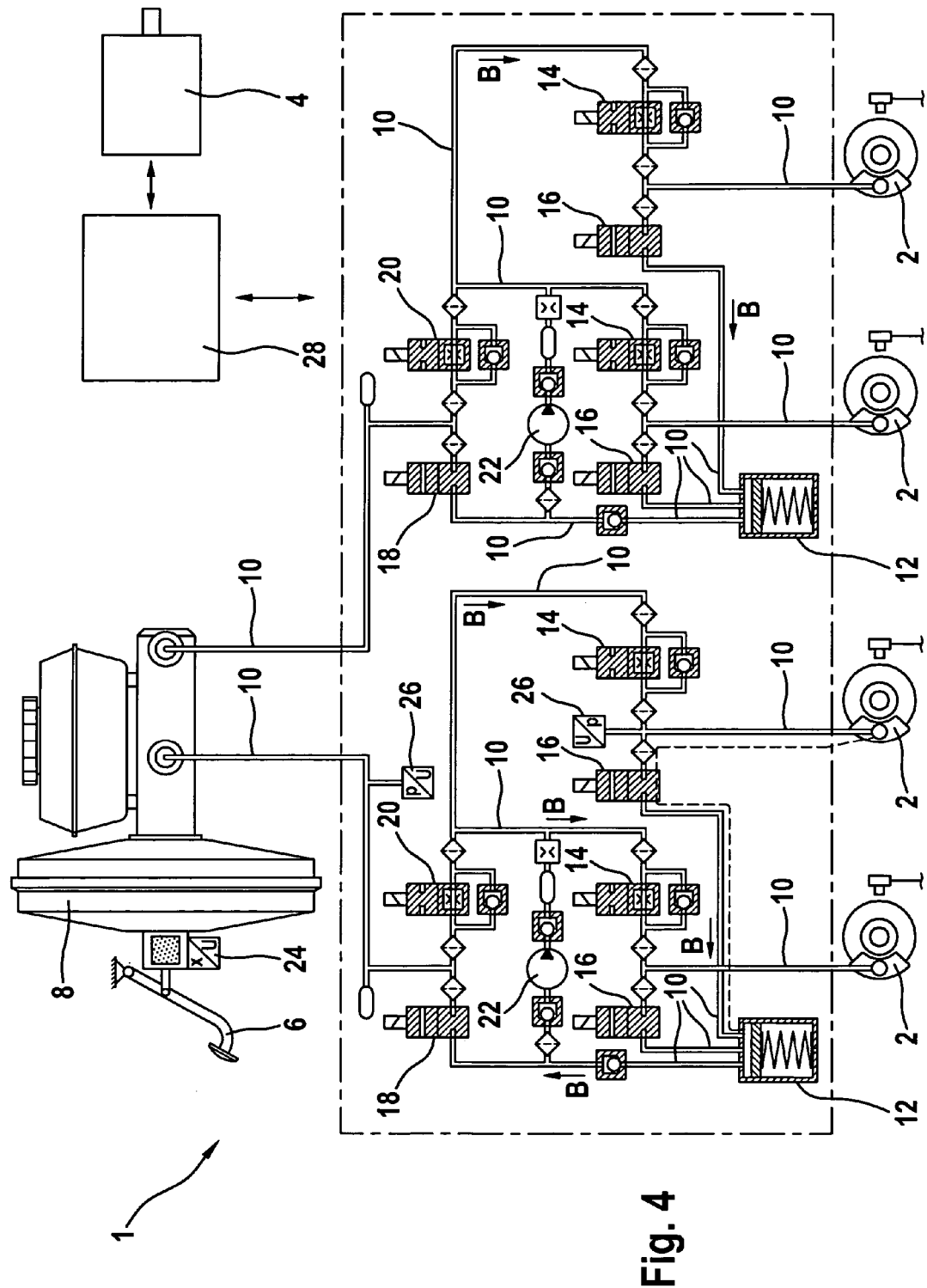
FIG. 4 shows a brake system (1) in phase 3.

Phase 3 is illustrated in FIG. 4. To reduce the brake torque of the friction brake 2, braking medium B is discharged into the pressure accumulator 12 by way of the NC-valve 16. As this occurs, the pressure in the tandem master cylinder 8 is kept constant by an appropriate control of the TCS-valve 20 and the NO-valve 14 so that the brake torque shift has no reactions on the brake pedal 6.

Figure 5:
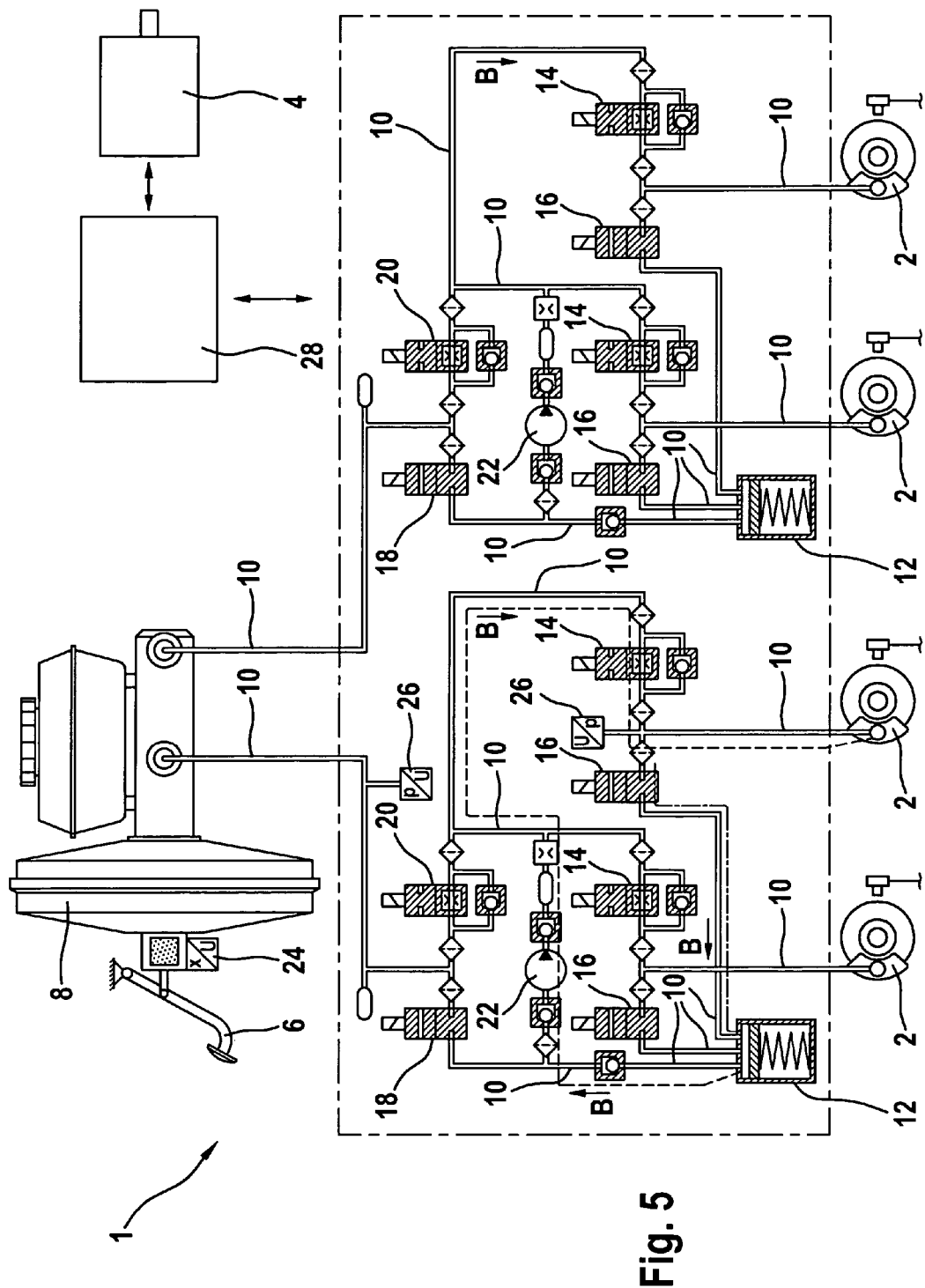
FIG. 5 shows a brake system (1) in phase 4.

In phase 4 of the braking operation which is illustrated in FIG. 5, braking medium B is pumped out of the pressure accumulator 12 by means of the motor-and-pump assembly 22 through the NO-valve 14 back into the hydraulic conduit 10 of the friction brake 2 in order to increase the brake torque there. The braking medium pressure in the tandem master cylinder 8 is maintained constant by the NO-valve 14, and superfluous braking medium B is discharged into the pressure accumulator 12 by way of the NC-valve 16.

Figure 6:
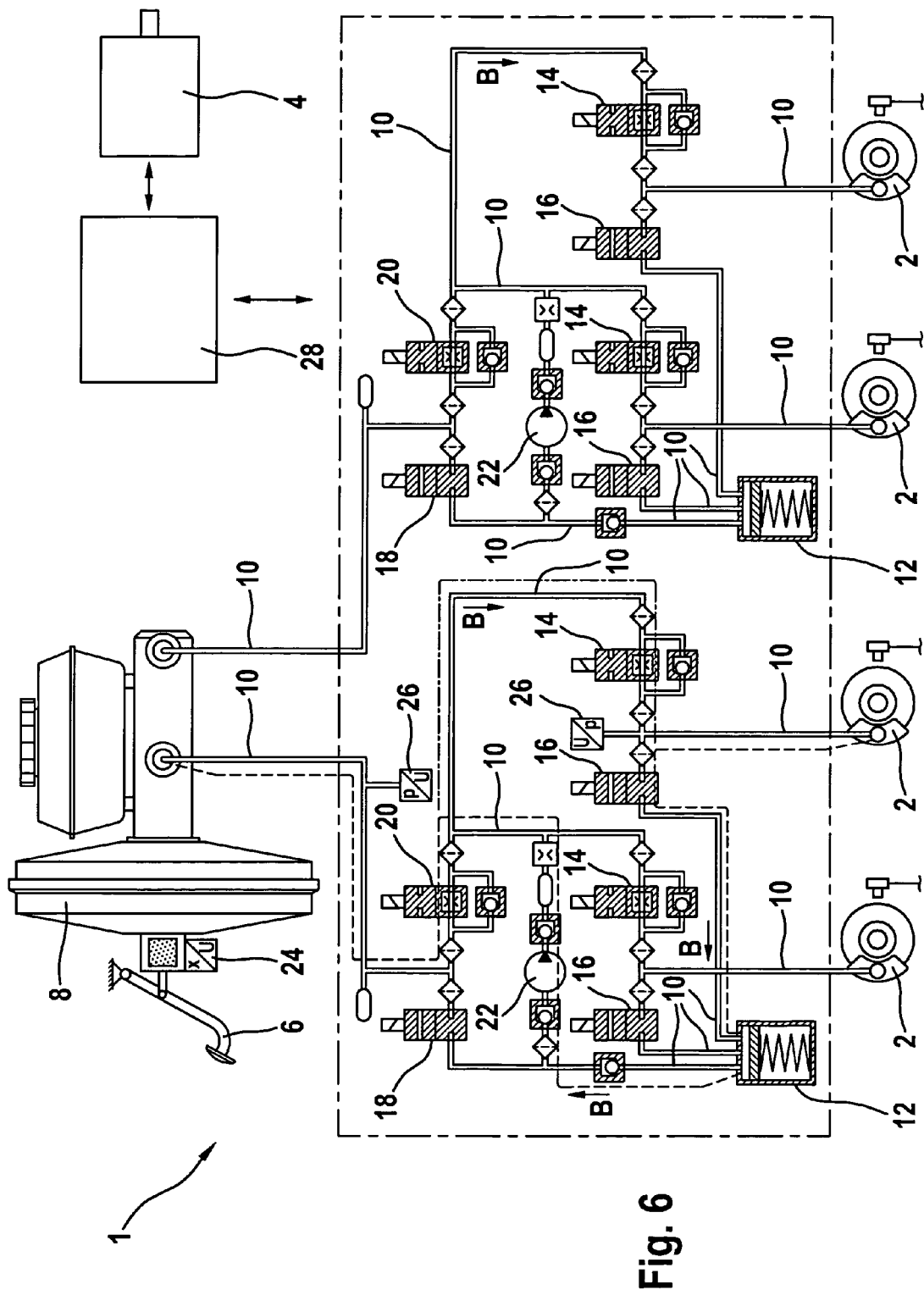
FIG. 6 shows a brake system (1) in phase 5.

In phase 5, as illustrated in FIG. 6, the pressure in the friction brake 2 is conducted through the NC-valve 16 when discharging braking medium B into the pressure accumulator 12. As this occurs, the pressure in the tandem master cylinder 8 is adjusted by the motor-and-pump assembly 22 and the TCS-valve 20 to the pressure determined by the driver by way of the pedal travel and by way of a force/travel deceleration characteristic curve. The NO-valve 14 adjusts a dynamic pressure which is higher than the pressure in the tandem master cylinder 8 so that the brake pedal 6 is then pushed back to its original position.

Figure 7:
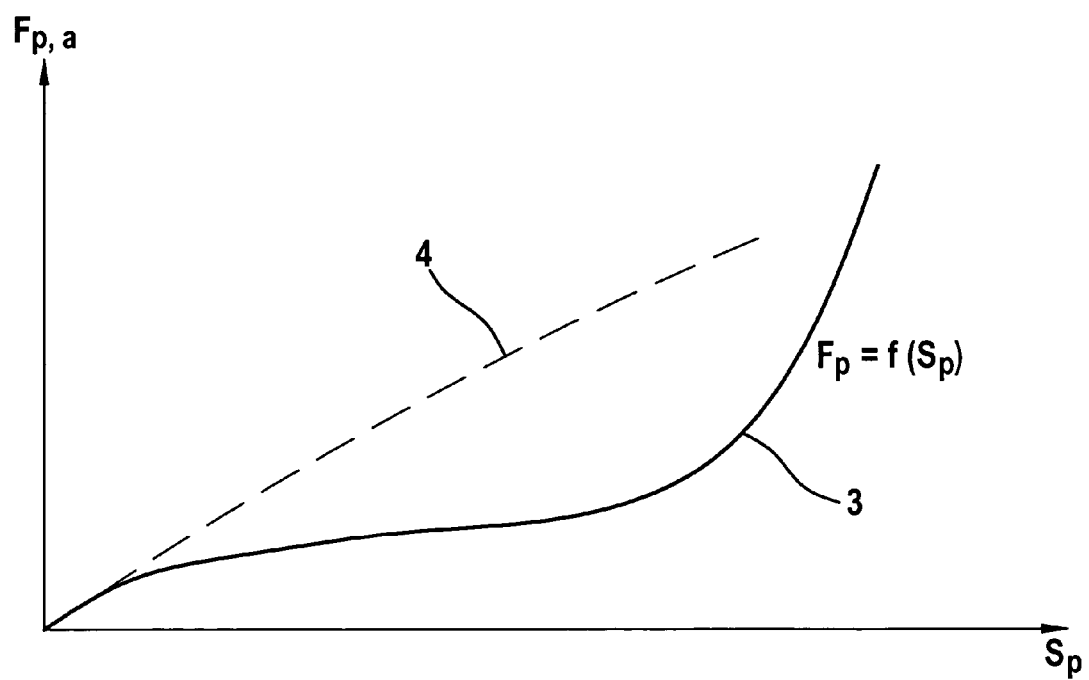
FIG. 7 shows a diagram illustrating a pedal characteristic curve.

To render the brake pedal movement more precise, the principal variation of the pedal force in dependence on the pedal travel of the brake pedal 6 is illustrated in curve 3 of FIG. 7. In contrast hereto, likewise the principal course of the deceleration in dependence on the pedal travel is illustrated in curve 4.

LIST OF REFERENCE NUMERALS 1 brake system
2 friction brake
4 generator
6 brake pedal
8 master brake cylinder
10 hydraulic conduit
12 pressure accumulator
14 NO-valve
16 NC-valve
18 ERV-valve (Electrical Reversing Valve)
20 TCS-valve
22 motor-and-pump assembly
24 travel indicator
26 pressure sensor
28 control unit
B braking medium

The invention claimed is:

1. A method for a brake system (1) of a motor vehicle having an electric-regenerative brake, in particular a generator (4) and a number of hydraulic friction brakes (2), the method comprising:
  driving at least one brake pressure generating device by way of a braking medium (B), the total deceleration of the brake system being composed of deceleration components of the friction brakes (2) and the electric-regenerative brake;
  discharging the braking medium (B) into a pressure accumulator (12) when braking with an electric-regenerative brake;
  adjusting nominal brake pressures at the friction brakes (2) with a first control process performed during a brake operation by a control unit (28); and
  adjusting a force/travel deceleration curve for a brake generating means with a second control process, by using the pressure of a braking medium (B) reacting to a brake pressure generating means.

2. The method according to claim 1, wherein a pressure volume of braking medium (B) is discharged which is reduced by the hydraulic friction brakes (2) when the brake torque generated by an electric-regenerative brake is generated by the hydraulic friction brakes (2) alone.

3. The method according to claim 1, wherein a nominal brake torque is determined by way of the brake pedal (6) of the brake system (1).

4. The method according to claim 1, wherein the brake operation is divided into a number of time phases by way of the electronic control unit (28), with said phases differing from each other by the division of the brake torque of the friction brakes (2) and the electric-regenerative brakes.

5. The method according to claim 1, wherein a demand resulting from one of the first and second control processes and placed on the basic brake system (1) is adjusted by way of the control unit (28), wherein the brake operation is divided into a number of time phases by way of the electronic control unit (28), and wherein one of the time phases is selected depending on the conditions of the brake system (1).

6. The method according to claim 1, further comprising setting the pressure in the master cylinder (8) and the pressure at the brake pedal (6) with an electronic changeover valve (18).

7. A brake system (1) of a motor vehicle comprising:
  a brake pressure generating device which is connected to a brake pedal (6), in order to generate hydraulic brake pressure by way of a braking medium (B) for friction brakes (2) of the brake system (1);
  an electronically controllable generator (4) to generate electric energy from motion energy of the motor vehicle;
  an electronic control unit (28) which adjusts nominal brake pressures at the friction brakes (2);
  a hydraulic unit with electrically controllable hydraulic valves, a number of pressure accumulators (12) and hydraulic conduits (10) which establish a connection between hydraulic valves (14, 16, 18, 20), the brake pressure generating device, the friction brakes (2), and a pressure accumulator (12), wherein the brake system (1) is configured so that a braking medium volume generated by the brake pressure generating device can be discharged into a pressure accumulator (12); and
  wherein pressure of the braking medium (B) acts on the brake pressure generating device to adjust a force/travel deceleration curve that is predefined by the brake system (1).

8. The brake system according to claim 7, wherein the pressure accumulator (12) is configured as a low-pressure accumulator compared to the hydraulic system of the brake system (1).

9. The brake system according to claim 7, wherein the hydraulic unit includes an additional brake pressure generating device with auxiliary energy allowing hydraulic brake pressure to be generated by way of the braking medium (B) for friction brakes (2).

10. The brake system according to claim 9, the pressure accumulator (12) is connected to the additional brake pressure generating device on an outlet side.

11. The brake system according to claim 9, wherein the brake pressure generating device is a master brake cylinder operated by auxiliary force and the additional pressure generating device is an electrically operable hydraulic pump.

12. The brake system according to claim 7, wherein a pressure sensor (26) for measuring the pressure of a braking medium (B) is positioned in one of a number of hydraulic conduits (10) leading to the friction brakes (2).

13. The brake system according to claim 7, wherein electrically controllable hydraulic valves (14, 16, 18, 20) are actuated such that pressure control is executed by a hydraulic valve (14, 16, 18, 20).

14. The brake system according to claim 7, wherein the brake pedal (6) includes a number of travel indicators (24).

15. The brake system according to claim 7 further comprising a number of pressure sensors (26) for measuring the pressure of a braking medium (B), and one of the number of pressure sensors (26) is positioned in a hydraulic conduit (10) leading to the brake pressure generating device.

16. The brake system according to claim 7, further comprising an electronic changeover valve (18) connected to the master cylinder (8) to determine a pressure therein, and connected to the brake pedal (6) to determine a pressure therein.

\* \* \* \* \*